United States Patent
Iaconis

(10) Patent No.: US 9,023,545 B2
(45) Date of Patent: May 5, 2015

(54) METHOD FOR OPERATING A FUEL CELL SYSTEM

(71) Applicant: Societe Bic, Clichy Cedex (FR)

(72) Inventor: Jean-Louis Iaconis, Burnaby, CA (US)

(73) Assignee: Societe Bic, Clichy Cedex (FR)

( * ) Notice: Subject to any disclaimer, the term of this patent is extended or adjusted under 35 U.S.C. 154(b) by 193 days.

(21) Appl. No.: 13/837,410

(22) Filed: Mar. 15, 2013

(65) Prior Publication Data

US 2014/0272648 A1   Sep. 18, 2014

(51) Int. Cl.
H01M 8/04   (2006.01)

(52) U.S. Cl.
CPC ...... *H01M 8/04201* (2013.01); *H01M 8/04231* (2013.01); *H01M 8/04223* (2013.01); *Y02E 60/50* (2013.01)

(58) Field of Classification Search
CPC .............. Y02E 60/50; H01M 8/04201; H01M 8/04223; H01M 8/04231
USPC ........................................................ 429/429
See application file for complete search history.

(56) References Cited

U.S. PATENT DOCUMENTS

| | | | |
|---|---|---|---|
| 4,700,682 A | 10/1987 | Ota et al. | |
| 6,039,030 A | 3/2000 | Robinson et al. | |
| 6,887,599 B2 | 5/2005 | Reiser et al. | |
| 7,089,919 B2 | 8/2006 | Perry et al. | |
| 7,198,474 B2 | 4/2007 | Arthur et al. | |
| 7,410,712 B2 | 8/2008 | Reiser et al. | |
| 7,520,299 B2 * | 4/2009 | Yanagisawa et al. | 137/630.14 |
| 7,887,968 B2 | 2/2011 | Jacobsen et al. | |
| 7,964,317 B2 | 6/2011 | Shioya et al. | |
| 2005/0142400 A1 * | 6/2005 | Turco et al. | 429/13 |
| 2006/0003204 A1 * | 1/2006 | Callahan et al. | 429/22 |
| 2006/0078780 A1 | 4/2006 | Margiott et al. | |
| 2006/0207669 A1 * | 9/2006 | Yanagisawa et al. | 137/625.39 |
| 2008/0176121 A1 | 7/2008 | Yamamiya | |
| 2008/0233446 A1 | 9/2008 | Zimmermann et al. | |
| 2010/0124687 A1 | 5/2010 | Brandon, II et al. | |
| 2013/0260185 A1 * | 10/2013 | Cartwright et al. | 429/9 |
| 2013/0316259 A1 * | 11/2013 | Rosenzweig et al. | 429/429 |
| 2014/0272647 A1 * | 9/2014 | Iaconis et al. | 429/429 |

OTHER PUBLICATIONS

International Search Report and Written Opinion issued in connection with the corresponding International Application No. PCT/IB2014/000952 on Oct. 1, 2014.

* cited by examiner

*Primary Examiner* — Stewart Fraser
(74) *Attorney, Agent, or Firm* — The H.T. Than Law Group

(57) ABSTRACT

Methods of operating a fuel cell system, wherein the fuel cell system is purged at system start-up, are disclosed. The purging automatically stops when the anode plenum is fully purged and replaced with fuel. Also discussed are purge valves that are manually turned ON but are automatically turned OFF as the fuel cell's production of electricity reaches a predetermined level, e.g., steady state or thereabout. The purge valve may be opened at system start-up, or may be opened at system shut-down so that the purge valve is armed and the fuel cell system is purged at the next start-up. Also disclosed is integrated fluidic interface module that contains various fluidic components including one of these purge valves. The integrated fluidic interface module can operate passively or without being actively controlled.

8 Claims, 14 Drawing Sheets

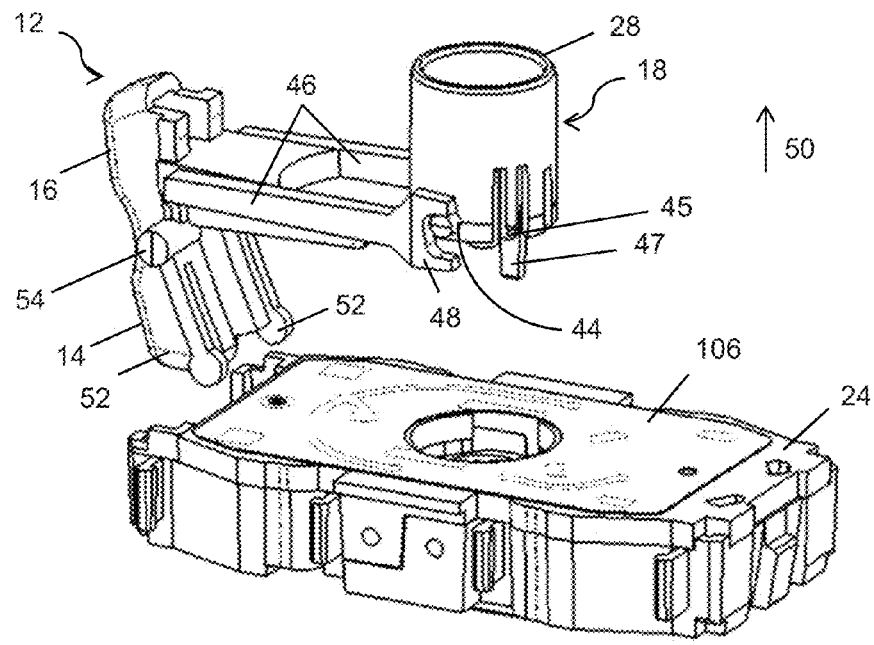
Figure 3A
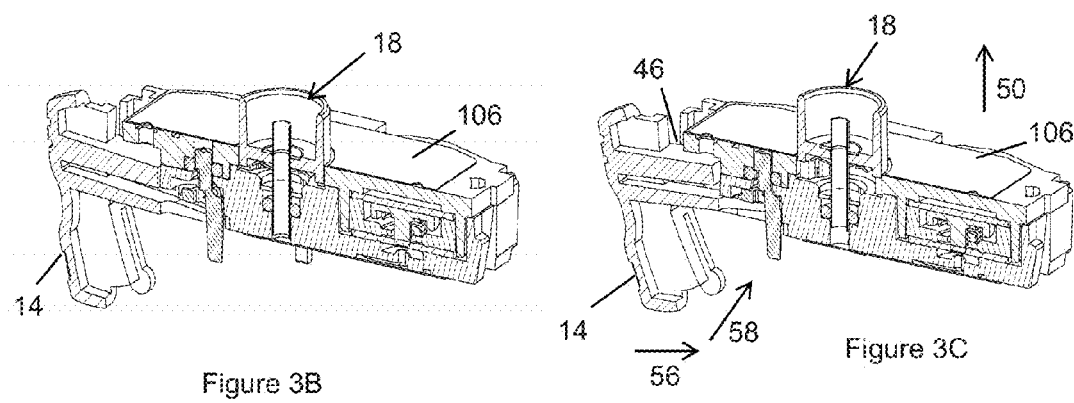
Figure 3B
Figure 3C

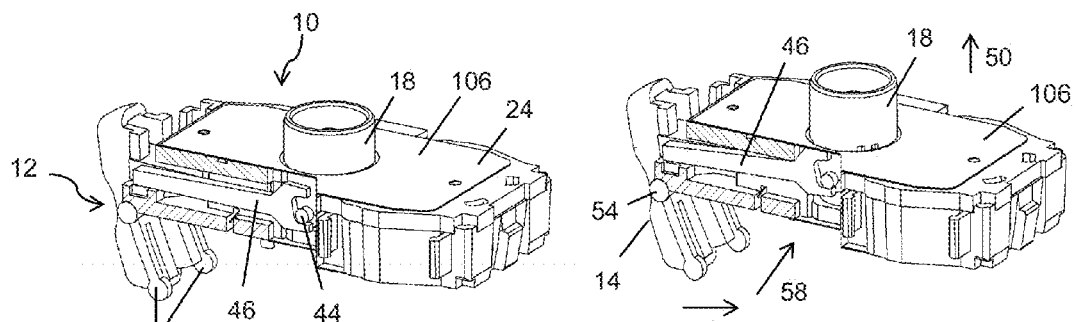
Figure 4A
Figure 4B
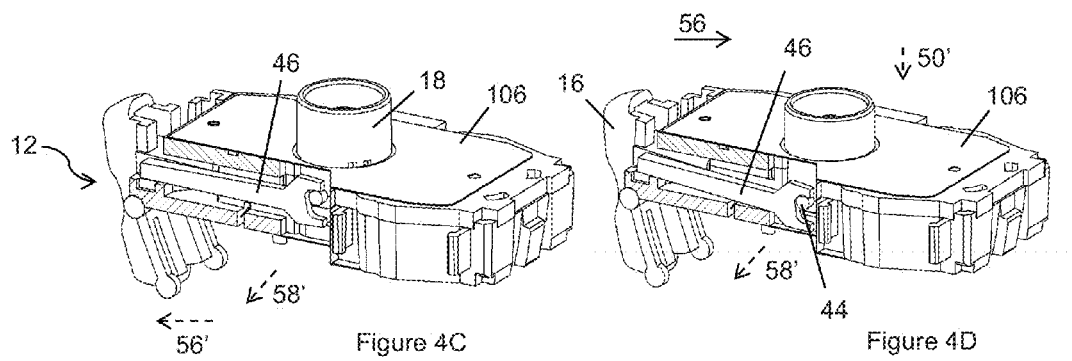
Figure 4C
Figure 4D
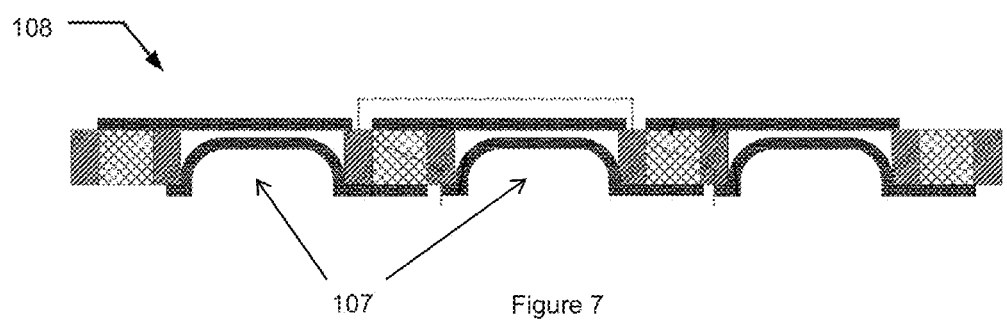
Figure 7

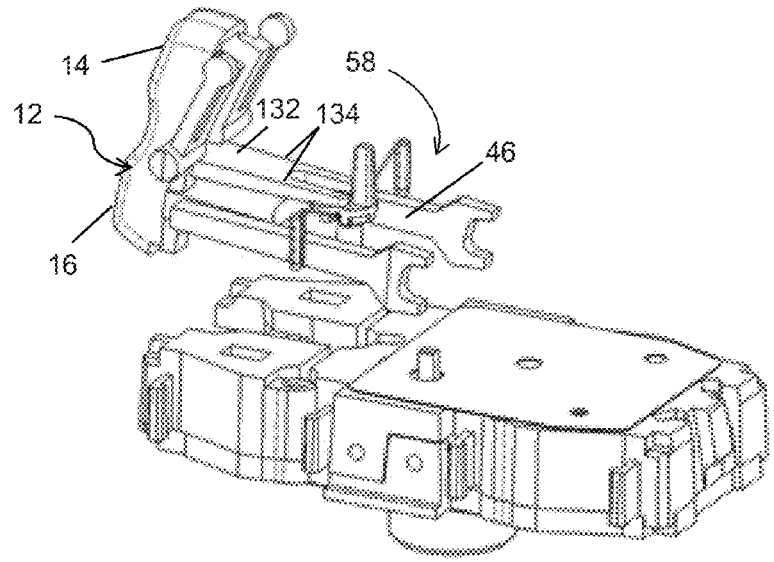
Figure 8B
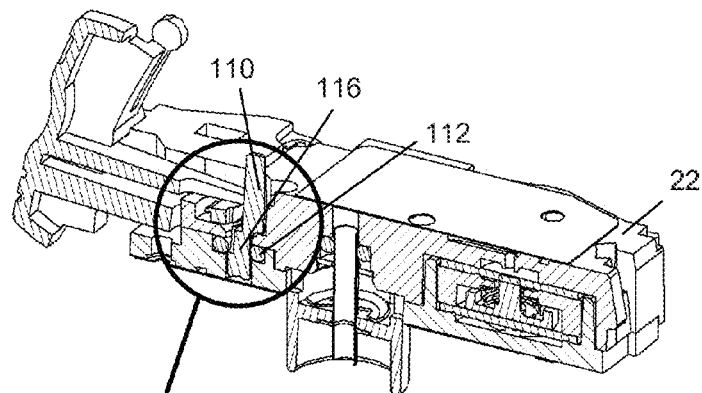
Figure 8C
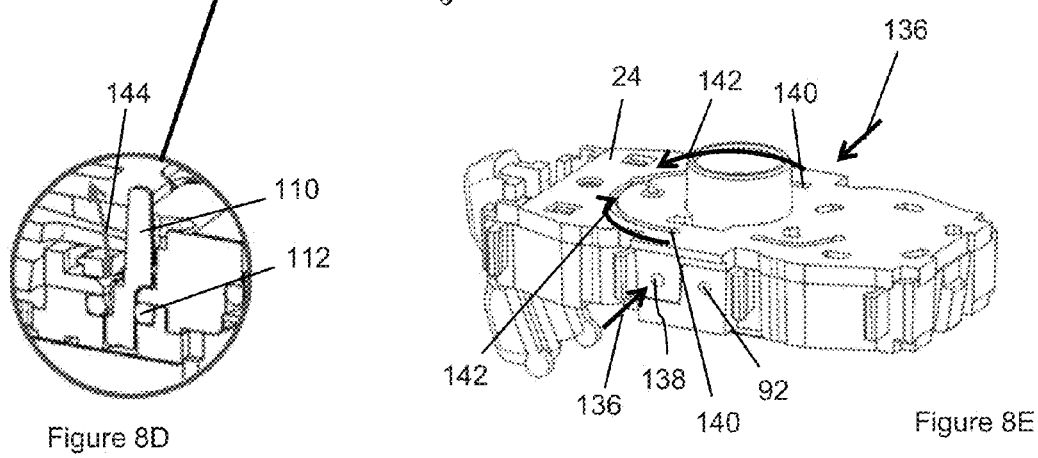
Figure 8D
Figure 8E

METHOD FOR OPERATING A FUEL CELL SYSTEM

FIELD OF THE INVENTION

This invention generally relates to methods for operating a fuel cell system and more specifically to methods for purging or venting the fuel cell system at start-up.

BACKGROUND OF THE INVENTION

Fuel cells are devices that directly convert chemical energy of reactants, i.e., fuel and oxidant, into direct current (DC) electricity. For an increasing number of applications, fuel cells are more efficient than conventional power generation, such as combustion of fossil fuels, as well as portable power storage, such as lithium-ion batteries. In particular, one use of fuel cells is to be a mobile power source for portable or mobile consumer electronic devices, such as cell phones, smart phone personal digital assistants, personal gaming devices, global positioning devices, rechargeable batteries, etc.

Known fuel cells include alkali fuel cells, polymer electrolyte fuel cells, phosphoric acid fuel cells, molten carbonate fuel cells, solid oxide fuel cells and enzyme fuel cells. Fuel cells generally run on hydrogen ($H_2$) fuel, and they can also consume non pure hydrogen fuel. Non pure hydrogen fuel cells include direct oxidation fuel cells, such as direct methanol fuel cells (DMFC), which use methanol, or solid oxide fuel cells (SOFC), which use hydrocarbon at high temperature. Hydrogen fuel can be stored in compressed form or within compounds such as alcohols or hydrocarbons or other hydrogen containing materials that can be reformed or converted into hydrogen fuel and byproducts. Hydrogen can also be stored in chemical hydrides, such as sodium borohydride ($NaBH_4$), that react with water or an alcohol to produce hydrogen and byproducts. Hydrogen can also be adsorbed or absorbed in metal hydrides, such as lanthanum pentanickel ($LaNi_5$) at a first pressure and temperature and released to a fuel cell at a second pressure and temperature. Hydrogen can also be released via thermolysis reaction of a metal hydride such as magnesium hydride ($MgH_2$).

Most low temperature hydrogen fuel cells have a proton exchange membrane or polymer electrolyte membrane (PEM), which allows the hydrogen's protons to pass through but forces the electrons to pass through an external circuit, which advantageously can be a smart phone, a personal digital assistant (PDA), a computer, a power tool or any device that uses electron flow or electrical current. The fuel cell reaction can be represented as follows:

Half-reaction at the anode of the fuel cell:

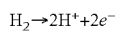

Half-reaction at the cathode of the fuel cell:

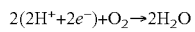

Generally, the PEM is made from a proton exchange polymer which acts as the electrolyte, such as Nafion® available from DuPont, which is a perfluorinated sulfonic acid polymer or other suitable membranes. The anode is typically made from a Teflonized carbon paper support with a thin layer of catalyst, such as platinum-ruthenium, deposited thereon. The cathode is typically a gas diffusion electrode in which platinum particles are bonded to one side of the membrane.

The patent and scientific literatures disclose few complete and commercialize-able fuel cell systems that include the generation of hydrogen fuel, the control of the fluidics, the balance of plant and the electrical power generation. The literatures do not discuss fluidic interface systems for fuel cells systems, particularly mobile fuel cell systems. Hence, there remains a need for such fuel cell systems.

SUMMARY OF THE INVENTION

The invention is directed to an integrated fluidic interface system or module for a fuel cell system that mates with a fuel source, such as hydrogen, regulates the incoming fuel pressure to a lower pressure that is usable with the fuel cell and purges the fuel plenum in the fuel cell when a user turns the fuel cell system ON or OFF. No other action is required from the user. In one embodiment, the integrated fluidic interface system has a single switch or ON/OFF button to activate all the fluidic components on the module.

The invention is further directed to a passive integrated interface system or module for a fuel cell system that performs the function discussed in the preceding paragraph without being actively controlled by a controller or micro-processor, without being powered by a power source other than an ON/OFF activation by the user, the pressure of the incoming fuel such as hydrogen and the electricity generated by the fuel cell. Such power source includes, but is not limited to, internal or external batteries, or power from the device that the fuel cell system powers.

The present invention is also related to methods of operating a fuel cell system, wherein the fuel cell system is purged or vented at system start-up. The purging automatically stops when the anode plenum is fully purged and its content is replaced with fuel. The present invention is also related to an inventive purge valve that is manually turned ON but is automatically turned OFF as the fuel cell's production of electricity reaches a predetermined level, e.g., steady state or thereabout. The purge valve may be opened at system start-up, or may be opened at system shut-down so that the purge valve is armed and the fuel cell system is purged at the next start-up. In one embodiment, the inventive purge valve is mechanically actuated or armed to open and electrically actuated to close.

The present invention includes a method for operating a fuel cell system comprising at least one fuel cell, said method comprises the steps of activating a switch and deactivating the switch. The activating step enables a flow a fuel from a fuel source to the fuel cell and initiates a venting step of an anode compartment in the fuel cell with said fuel. The venting step continues until the anode compartment is substantially vented and the venting step automatically stops when the anode compartment is substantially filled by said fuel. The deactivating step stops the flow of said fuel.

The activating step further opens a purge valve, or the deactivating step opens and arms the purge valve. The power from the at least one fuel cell stops the venting step, and preferably this power is generated during the fuel cell's conditioning period. This power is substantially free of power from other sources. The activating step also connects the fuel cell to a conductive element in the purge valve, which comprises a shape memory alloy wire. The activating step also connects the fuel cell to an external load after the venting step.

The present invention further includes a method of operating a fuel cell system comprising at least one fuel cell, said method comprising the steps of
(a) flowing fuel to the fuel cell system;
(b) connecting the at least one fuel cell to a conductive element in a purge valve;
(c) venting an anode of the at least one fuel cell through the purge valve;
(d) disconnecting the at least one fuel cell from the purge valve; and (e) connecting the at least one fuel cell to an external load.

The conductive element comprises a shape memory alloy and the fuel cell heats up the conductive element which retracts and moves the purge valve to a closed position. This method further comprises the step of moving the purge valve to an open position at the fuel cell system's start-up or at the fuel cell system's shut-down. The disconnecting step (d) occurs without being controlled by a processor or by a person. The disconnecting step (d) is electrically actuated and the connecting step (b) is manually actuated.

BRIEF DESCRIPTION OF THE DRAWINGS

In the accompanying drawings, which form a part of the specification and are to be read in conjunction therewith and in which like reference numerals are used to indicate like parts in the various views and various embodiments:

FIG. 3A is a partial exploded view of FIG. 1B; FIGS. 3B-3C are cross-sectional views of FIG. 1B showing an actuation of a module interface port 18;

FIGS. 4A-4D are perspective view of the inventive integrated fluidic interface module 10 from reference surface 24 showing a sequence of actuation of module interface port 18 by switch 12;

FIG. 7 is a cross-sectional view of an exemplary fuel cell;

FIG. 8B is a further partial exploded view of FIG. 8A; FIG. 8C is the same as FIG. 1C but viewed from reference surface 22 and FIG. 8D is an enlarged view of the purge shuttle of FIG. 8C; FIG. 8E is a perspective view from reference surface 24 of the inventive integrated fluidic interface module showing the purge flow manifold;

Figure 1A:
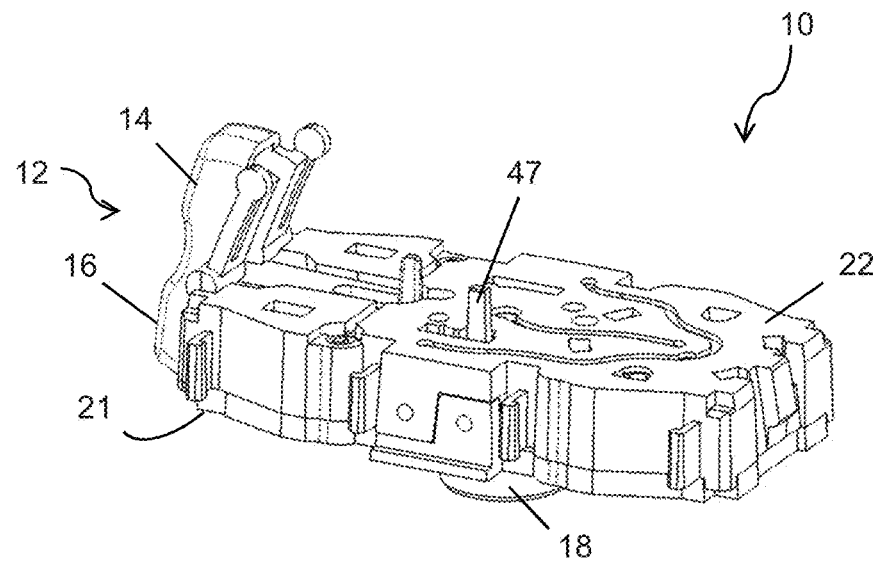
FIG. 1A is a perspective view from a reference surface 22 of an inventive integrated fluidic interface module 10 and FIG. 1B is a perspective view from reference surface 24 opposite to reference surface 22 of an inventive integrated fluidic interface module.

A parts list correlating the reference numbers used in the drawings to the part names used in the specification is provided at the end of the specification.

DETAILED DESCRIPTION OF THE PREFERRED EMBODIMENTS

Integrated fluidic interface modules of the present invention are fluidic modules that connect a fuel cartridge, such as a methanol or butane fuel cartridge, hydrogen storage device or hydrogen generator, to a fuel cell, such as PEM fuel cells, DMFC, SOFC or other fuel cells. Integrated fluidic interface modules of the present invention provide a docking port or connection to the fuel cartridge to allow the fuel to flow from the cartridge to the integrated fluidic interface module. The integrated fluidic interface modules also regulate the pressure of the incoming fuel to a lower pressure that fuel cells prefer. The inventive integrated fluidic interface modules also purge the fuel cells to remove unwanted gases in the anodes of the fuel cells semi-automatically or manually.

Figure 1B:
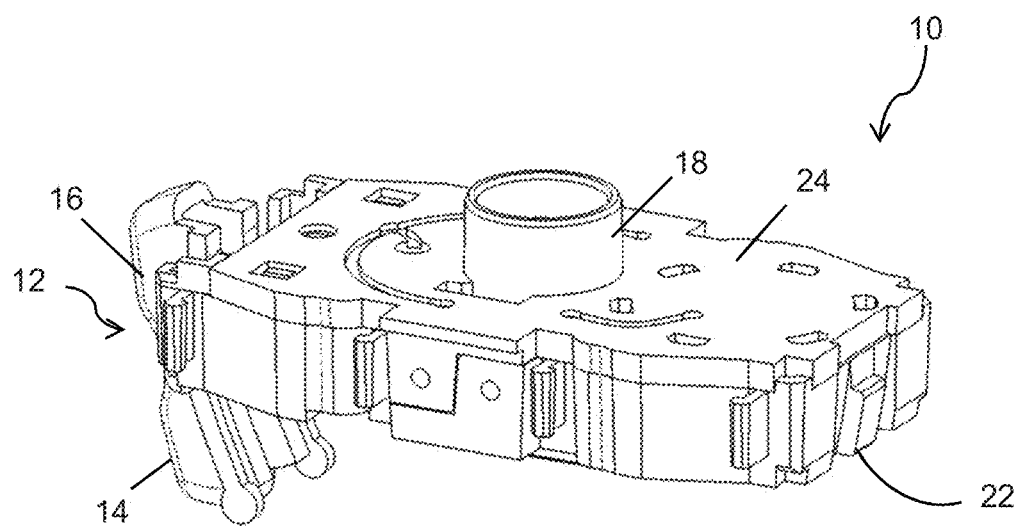
Figure 1C:
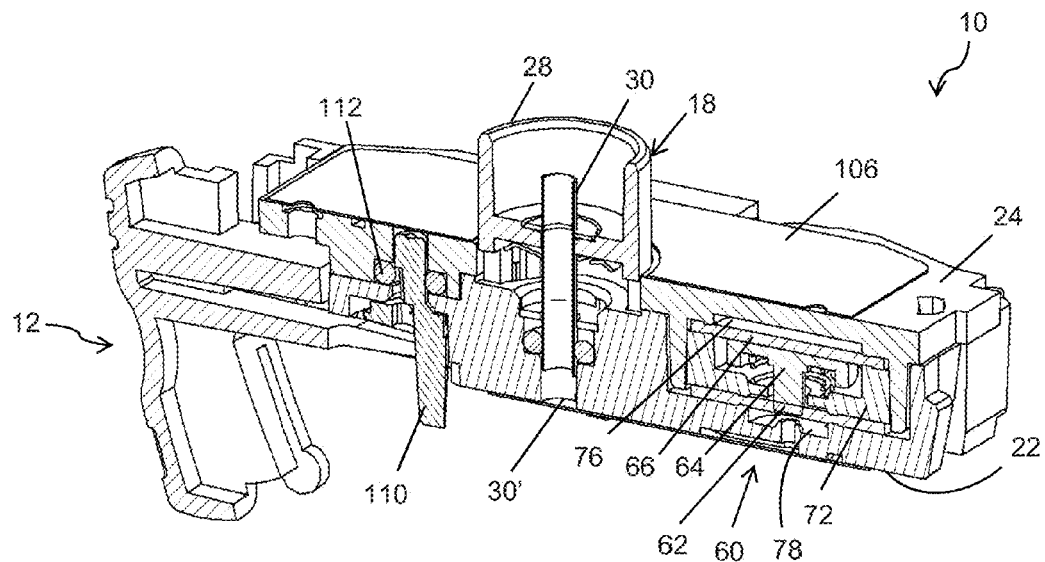
FIG. 1C is a cross-sectional view of FIG. 1B.

Referring to FIGS. 1A-1C, integrated fluidic interface module 10 (hereinafter module 10) is shown from the top side and the bottom side, respectively. Module 10 has switch 12 with an "ON" segment 14 and an "OFF" segment 16. Module 10 also have a module interface port 18 sized and dimensioned to connect to a fuel cartridge 20 shown in FIG. 2A. Top side 22 and bottom side 24 of module 10 contain a plurality of micro-fluidic channels that are described in details below. It is noted that the terms "top" and "bottom" are relative terms and are used for the ease of describing the present invention. Surfaces 22 and 24 are reference surfaces designated to aid in the description of the present invention. These terms do not necessarily indicate the orientation of module 10 or the fuel cell system as a whole during actual operation. Fuel cartridge 20, module 10 and the fuel cell system incorporating module 10 can operate in any orientation.

Figure 2:
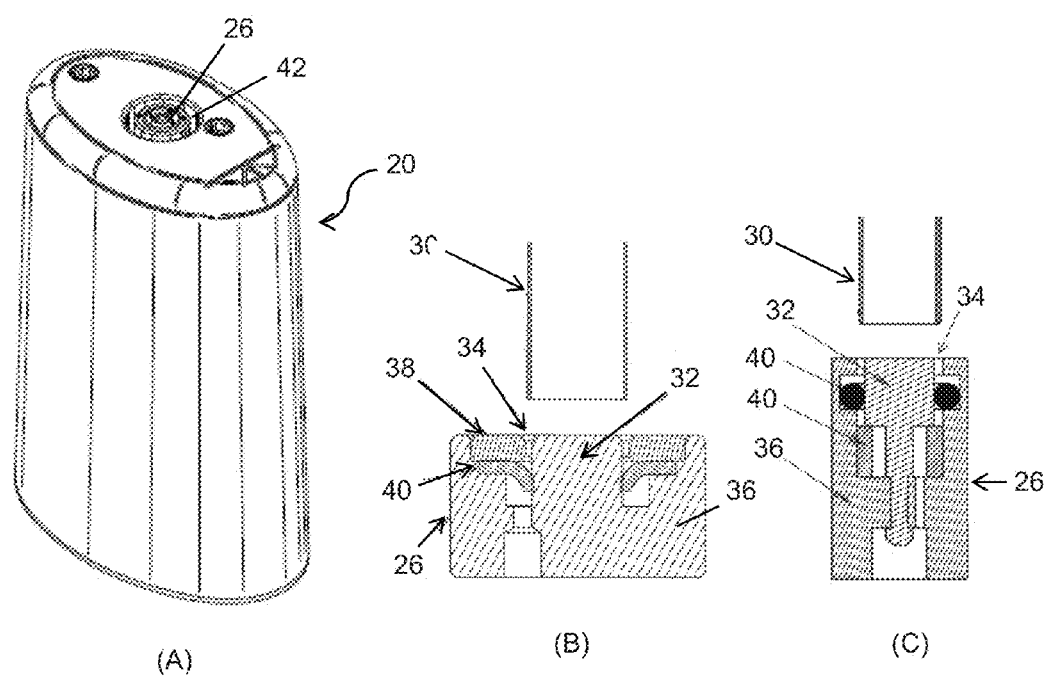
FIG. 2A is a top perspective view of an exemplary fuel cartridge.
FIGS. 2B-2C are cross-sectional views of exemplary cartridge shut-off valves.
FIG. 2D is a bottom perspective view of an exemplary fuel cell system.

FIGS. 2A-2C show an exemplary fuel cartridge 20 and exemplary cartridge shut-off valves 26 that can be used with module 10. Fuel cartridge 20 is described in published patent applications US 2011/0212374, US 2011/0099904, and US 2011/0104021 and U.S. D673,497 and valves 26 are described in published patent applications US 2011/0121220, US 2011/0189574, US 2011/0212374 and US 2011/0099904. These references are incorporated herein by reference in their entireties. Module interface port 18 comprises outer guard 28 and inner tube 30. Tube 30 is sized and dimensioned to open cartridge shut-off valve 26, shown in FIGS. 2B-2C. Shut-off valve 26 may have a center post 32, which forms a gap 34 with valve body 36 and/or seal retainer 38. Tube 30 of module interface port 18 enters gap 34 to open one or more seal 40. When tube 30 is withdrawn from cartridge valve 26, seal(s) 40 re-closes fuel cartridge. 20. Other suitable shut-off valves 26 usable with module 10 include, but are not limited to U.S. Pat. Nos. 7,537,024, 7,762,278, 7,059,582 and 6,924,054 and published patent application US 2008/0145739.

Outer guard 28 of module interface port 18 is sized and dimensioned to match a corresponding channel 42 on cartridge 20. One advantage of having guard 28 and matching channel 42 is to ensure that a proper fuel cartridge is being used with module 10 or fuel cell system 21. Guard 28 and channel 42 may have other shapes, such as oval, star, polygonal or any regular or irregular shapes.

Figure 2D:
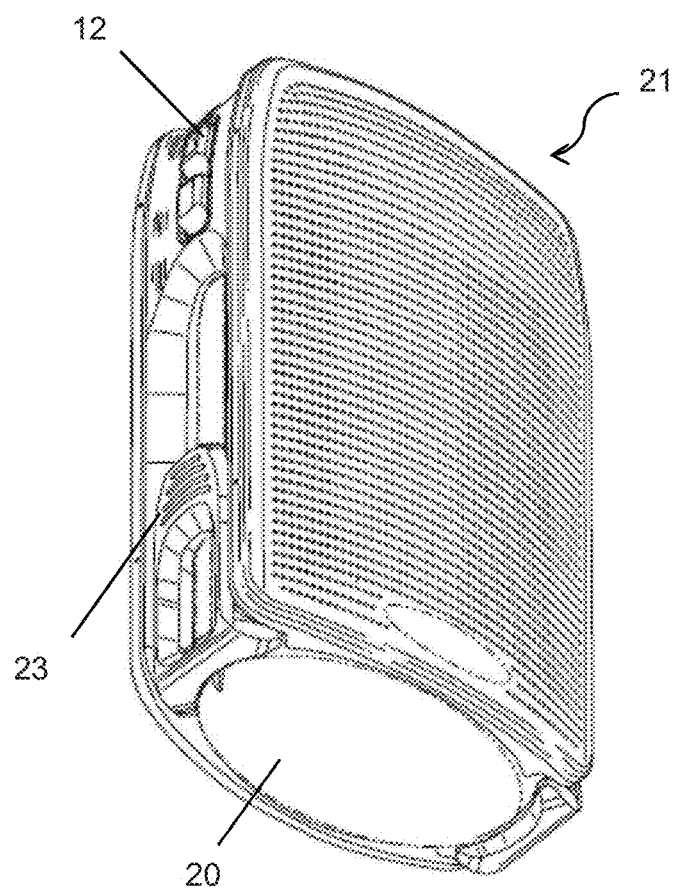

FIG. 2D illustrates an exemplary fuel cell system 21 that may incorporate the inventive module 10. Switch 12 is also illustrated in FIG. 2D. Fuel cartridge 20 may be inserted into an opening in fuel cell system 21. Fuel cell system 21 may be a fuel cell charger with a USB charging port or DC port (shown below in FIG. 10C) on its surface. Fuel cell system 21 may also be a consumer electronic device, a flashlight, a radio, a music player such as a MP3 player, a computer tablet or a laptop. Fuel cell system preferably has clamp 23 to securely hold cartridge 20 therewithin after insertion. Clamp 23 may also be actuated or pushed to release cartridge 20. The present invention is not limited to any particular application or usage of the fuel cell system.

Referring to FIGS. 3A-3C, switch 12 interacts with module interface port 18 to open valve 26 on fuel cartridge 20. Module interface port 18 has preferably two knobs 44 disposed on its side opposite from each other. Switch 12 has two corresponding yokes 46 that form a U-shaped end 48 adapted to fit around knobs 44, as best shown in FIG. 3A. U-shaped end 48 defines a space that is larger than knob 44, so that when ON segment 14 of switch 12 is pushed, the lower part of U-shaped end 48 lifts knob 44 and module interface port 18 in the direction of arrow 50 to move module interface port 18 and tube 40 toward cartridge valve 26 to open it. As switch 12 returns to its rest position due to the action of spring arms 52 against a hard surface on the fuel cell system (not shown), the extra space between the arms in U-shaped end 48 allows switch 12 to return to its neutral or rest position without retracting module interface port 18. This allows module interface port 18 to remain engaged to keep cartridge valve 26 open.

Preferably, module interface port 18 does not contain a shut-off valve and cartridge shut-off valve 26 is used as the fluidic shut-off valve for fuel cell system 21. Advantages of omitting a shut-off valve on module 10 include obviating the wear and tear of such a valve, which is used repeatedly, and minimizing the probability of failure of such valve. The advantages of relying on the cartridge shut-off valve 26 include that a fresh new valve is provided with each new cartridge.

From a neutral or rest position shown in FIG. 3B, yokes 46 are substantially parallel to module 10. In one embodiment, switch 12 has pivot boss 54 that allows switch 12 to pivot or rotate. As ON segment 14 is pushed in direction 56, yokes 46 are rotated in direction 58. This movement moves module interface port 18 in direction 50 to an engaged position shown in FIG. 3C, as discussed above.

Module interface port 18 further comprises a mechanical detent 45 that cooperates with another mechanical feature in module 10 to keep module interface port 18 in the engaged position shown in FIG. 3C after switch 12 has returned to its neutral position. Module interface port 18 further comprises leg 47 that protrudes through module 10 to actuate an electrical switch on a printed circuit board (PCB) that contains the fuel cell circuit whenever module interface port 18 is in the engaged position shown in FIG. 3C.

This sequence of operation of module interface port 18 is further illustrated in FIGS. 4A-4D. Module 10 shown in FIG. 4A is in the OFF state with module interface port 18 retracted with spring arms 52 maintaining switch 12 in its neutral position. A user moves ON segment 14 of switch 12 in direction 56 which rotates yokes 46 about pivot boss 54 in direction 58 and extends module interface port 18 in direction 50 to turn module 10 to the operating or ON position. Extending module interface port 18, as discussed above, opens shut-off valve 26 of cartridge 20 to commence fuel flow from the cartridge through module 10 to fuel cell system 21. As the user releases switch 12, spring arms 52 pushes against a hard surface on the fuel cell system (not shown) to move switch 12 and yoke 46 back in opposite direction 56' and direction 58', respectively, as shown in FIG. 4C. Module interface port 18 remains extended and the top of U-shaped end 48 of yoke 46 rests on knob 44 of module interface port 18. Module 10 should remain in the configuration shown in FIG. 4C while the fuel cell system is operating. To turn the fuel cell system OFF, the user moves OFF segment 16 of switch 12 in direction 56. This rotates yoke 46 in direction 58' to move knob 44 and module interface port 18 in direction 50' to retract module interface port 18 to return shut-off valve 26 in cartridge 20 to the closed position, as shown in FIG. 4D. As the user releases switch 12, module 10 returns to the configuration of FIG. 4A.

It is noted that in the configurations of FIG. 4B or FIG. 4D, a purge valve may be activated or armed at substantially the same time as ON segment 14 or OFF segment 16 of switch 12 is activated to purge the anode side of the fuel cells. The operations and structures of module 10's purge valve are discussed below. Also as module interface port 18 is extended as shown in FIG. 4B the fuel cell circuit is activated or turned ON, and as module interface port 18 is retracted as shown in FIG. 4D the fuel cell circuit is de-activated or turned OFF.

Figure 5:
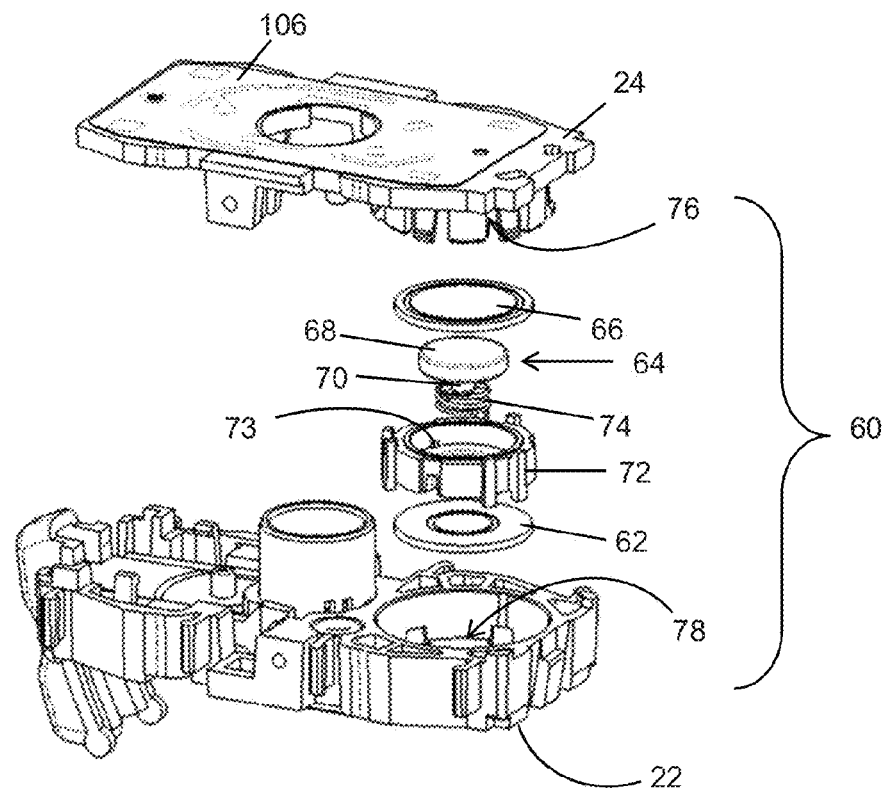
FIG. 5 is a partial exploded view of FIG. 1B showing the individual parts of pressure regulator 60.

After the fuel, e.g., hydrogen gas, enters module 10 through module interface port 18, the fuel's pressure is modulated by pressure regulator 60. As best shown in FIGS. 1C and 5, fuel enters through inner tube 30 and reaches top side 22 of module 10, where the fuel flows to the inlet side or high pressure side of pressure regulator 60. A suitable pressure regulator comprises inlet diaphragm or high pressure diaphragm 62, shuttle 64, outlet diaphragm or low pressure diaphragm 66. Shuttle 64 has larger end 68 in contact with outlet diaphragm 66 and smaller end 70 in contact with inlet diaphragm 62, and is housed in shuttle housing 72. Spring 74 is located inside pressure regulator 60 and is positioned between large end 68 of shuttle 64 and inlet diaphragm 62. The spring force of spring 74 and the resiliency of diaphragms 62 and 66, as well as the pressure in outlet chamber 76, determine the opening pressure or cracking pressure of pressure regulator 60. Inlet chamber 78 is located between inlet diaphragm 62 and a portion of top side 22 of module 10. Preferably, shuttle housing 72 is in fluid communication with a reference pressure. In one example, shuttle housing 72 is provided with at least one vent 73 to access atmospheric pressure.

The operations of suitable pressure regulators with movable shuttles are well described in commonly owned patents and patent applications, including U.S. Pat. No. 8,002,853 and published patent applications US 2010/0104481, US 2011/0189574 and 2011/0212374, and commonly owned patent application entitled "Fluidic Components Suitable for Fuel Cell Systems Including Pressure Regulators and Valves" Docket No. BIC-169 and filed on even date herewith. The references are incorporated herein by reference in their entireties. Other types of suitable pressure regulators include but are not limited to those described in published patent applications US 2008/0233446 and WO 2011/127608. Any pressure regulator described in these references can be used with module 10. These references are incorporated herein by reference in their entireties.

Figure 6A:
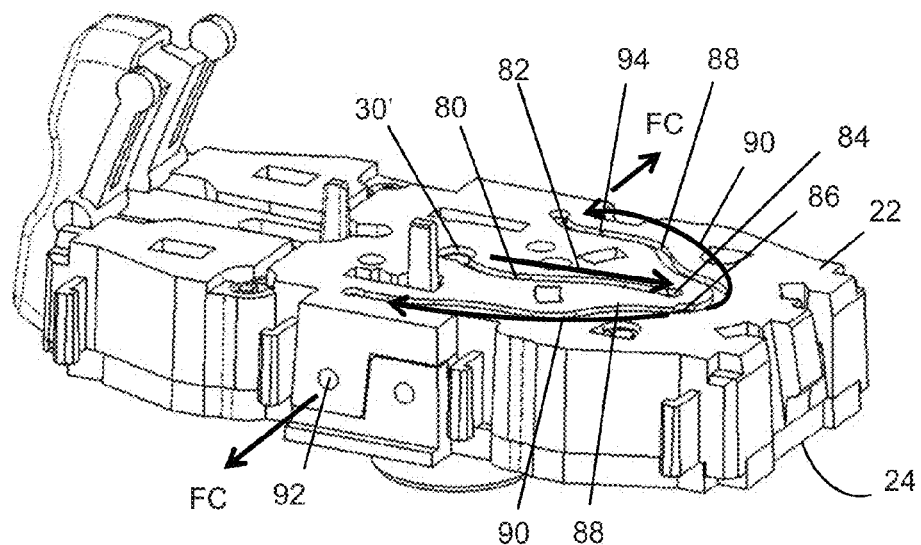
FIG. 6A is a perspective view from a reference surface 22 of the inventive integrated fluidic interface module showing a fuel manifold and FIG. 6B is a perspective view from reference surface 24 of the inventive integrated fluidic interface module showing a pressure feedback flow path.

Referring to FIG. 1C, fuel enters through tube 30 to reach top side 22 of module 10. At the terminal end 30' of tube 30, as best shown in FIG. 6A, fuel is directed to inlet channel 80 and flows in direction 82 to inlet 84 of pressure regulator 60. If the outlet pressure in outlet chamber 76 and the pressure exerted by spring 74 and diaphragms 62 and 66 are below the opening pressure of regulator 60, inlet diaphragm 62 flexes toward outlet diaphragm 66 and incoming fuel enters inlet 84 into inlet chamber 78, where it expands and undergoes a pressure drop due to the expansion.

After expanding and dropping pressure, the fuel exits pressure regulator 60 at outlet 86, as best shown in FIG. 6A, flows through outlet channels 88 in directions 90 and out of module 10 at module outlet 92 to the fuel cell(s) illustrated in FIG. 7, discussed below, and fuel cell system 21. Although two outlet channels 88 are shown, any number of outlets can be utilized.

Figure 6B:
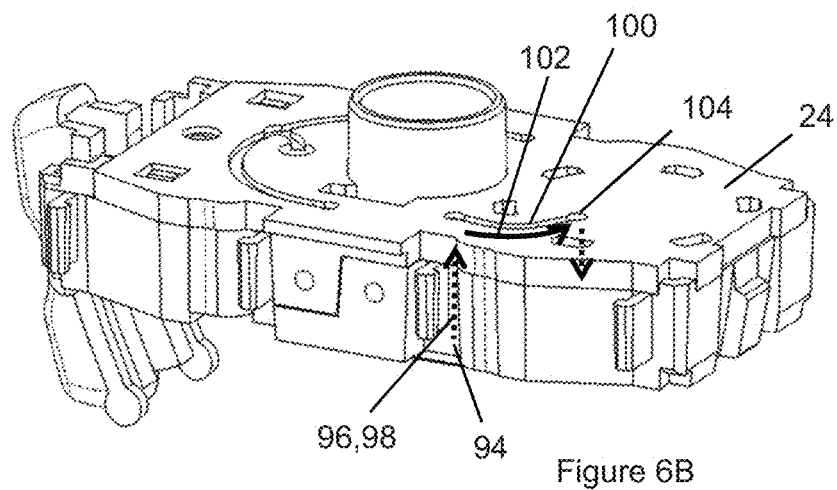

A pressure feedback structure is also provided to lead the outlet pressure and/or pressure in the fuel cells back to outlet diaphragm 66, so that pressure regulator 60 may close, i.e., shuttle 64 pushes inlet diaphragm 62 toward inlet 80 to stop the flow of fuel through the pressure regulator until the outlet pressure or fuel cell pressure decreases. A feedback port 94 is provided on outlet channel 88, shown in FIG. 6A. Port 94 is connected to first feedback channel 96 in direction 98 and along second feedback channel 100 along direction 102 to outlet chamber port 104, where the fuel outlet pressure can be sensed by outlet diaphragm 66, as best shown in FIG. 6B. It is noted that the pressure feedback structure has no dedicated exit, i.e., it is a blind hole, such that feedback flow directions 98 and 102 can be reserved depending on the flexing states of diaphragms 62 and 66.

Additionally, the flow channels shown in FIGS. 6A and 6B can be covered by a thin layer to create closed flow channels to keep the fuel from exiting the channels. These thin covers can be thin adhesive films made from materials that are inert to fuel cell fuels, such as hydrogen, oxygen or methanol. Such thin covering films are shown as element 106 in FIGS. 1C, 3A-C, 4A-D, 5A, et seq., and can also be used to cover purge channels, described below.

Integrated fluidic interface module 10 also comprises a purge system or purge valve (hereinafter designated with reference number 109 or 109') to remove residual gas from the anode plenum in the fuel cells. An exemplary fuel cell 108 is illustrated in FIG. 7, which shows side-by-side planar PEM fuel cells disclosed in commonly owned published international application WO 2011/079377. Other suitable fuel cells, including planar and stacked fuel cells, are discussed below. Residual gases including byproducts, inert gases and water vapors can collect on the anode side 107 of fuel cell 108. It is desirable to purge these residual gases from anode 107 periodically, or at system start up or at system shut-down using fuel, such as hydrogen gas, from fuel cartridge 20. Purging the fuel cells or the fuel cell system is venting the anode plenum. In one embodiment, when a purge valve is opened fuel enters module 10 flowing through pressure regulator 60 and out of module outlet 92 to anode 107 of fuel cell 108. The fuel gas pushes the residual or inert gas from the anode back to module 10 and through the purge valve and out to vent.

One embodiment of the purge valve system, described below and illustrated in FIGS. 8A-10B, purge valve 109 is manually activated by a user preferably to start the fuel cell system, e.g., by pushing ON segment 14 of switch 12. Purge valve 109 remains ON or opened when the switch returns to its neutral or rest position. In other words, the closing of the purge valve is not connected to switch 12. Instead, purge valve 109 is closed or moved to the OFF position when the fuel cell reaches a steady level after a start-up conditioning process to produce electricity. The conditioning process is a start-up process, where fuel cells heat and humidify themselves. The electricity from the fuel cell is conducted through a resistive load, which heats up the resistive load. When heated to a predetermined level, the resistive load such as a shape memory alloy changes its shape or contracts back to a shape that it remembers and closes the purge valve or moves it to the OFF position. The resistive load may include a SMA and other resistive elements, which may preferentially located to speed up the warming process. This inventive purge valve system is therefore manually or mechanically actuated and electrically and/or thermally de-actuated. In other words, purge valve 109 is a semi-automatic purge valve. The present invention relies on the fuel cell's ability to produce enough power to actuate the resistive load/shape memory alloy load to close the purge valve. The present invention does not rely on sensors or control systems to detect whether the anode is filled with hydrogen. The present invention uses the fuel cell both as a hydrogen gas sensor and as a power source to close the purge valve.

Figure 10A:
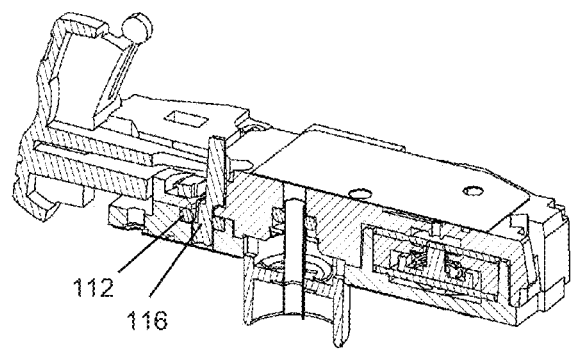
FIGS. 10A-10B are similar to FIG. 8C showing the open and closed configuration, respectively, of the inventive purge valve.
Figure 10B:
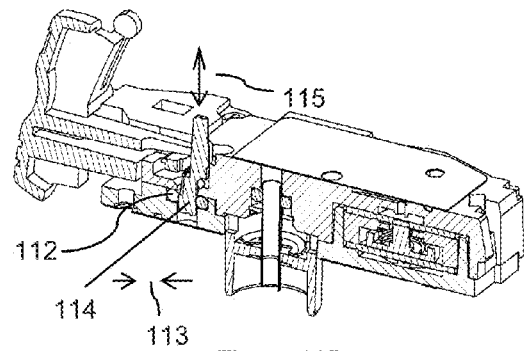

The inventive purge system 109 in module 10 comprises at least a purge shuttle 110 that cooperates with a sealing member 112, such as an O-ring or a sealing disk, as shown in FIGS. 1C, 8A-8D and 10A-10B. As best shown in FIGS. 9A-9C, shuttle 110 comprises a sealing portion 114, an open portion 116, a shoulder 118 and an optional extension 120. Open portion 116 contains a cut-out or an open notch 122, which is a cut-out that lets residual gases through to exit. In a closed configuration as shown in FIG. 10B, sealing portion 114 of purge shuttle 110 is positioned next to sealing member 112. In an open configuration to vent gases shown in FIG. 10A, open portion 116 and notch 122 are positioned next to sealing member 112 to create a flow path through notch 122 and purge shuttle to vent residual gas.

Referring to FIG. 10B, the compressive force exerted by compressed sealing member 112 on sealing portion 114 of purge shuttle 110 is in direction 113, and the actuation force that moves shuttle 110 from the closed configuration of FIG. 10B to the open configuration of FIG. 10A is in direction 115. Directions 113 and 115 are substantially perpendicular to each other. The diameters of sealing portion 114 and open portion 116 are substantially the same, and these diameters are larger than the inner diameter of sealing member 112, so that sealing member 112 is compressed and exerts a force in direction 113. There is no other axial or longitudinal force other than friction or no biasing force from a spring that acts on purge shuttle 110 when it moves, thereby enabling purge shuttle 110 to remain in the closed position and to remain in the open position, once purge shuttle 110 is so moved.

Figure 8A:
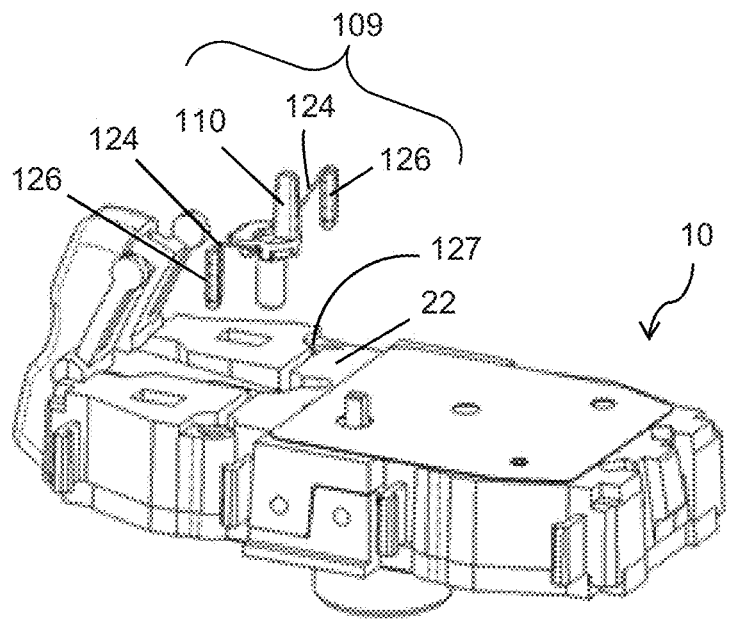
FIG. 8A is a partial exploded view from reference surface 22 of the inventive integrated fluidic interface module showing an inventive purge valve.
Figure 9:
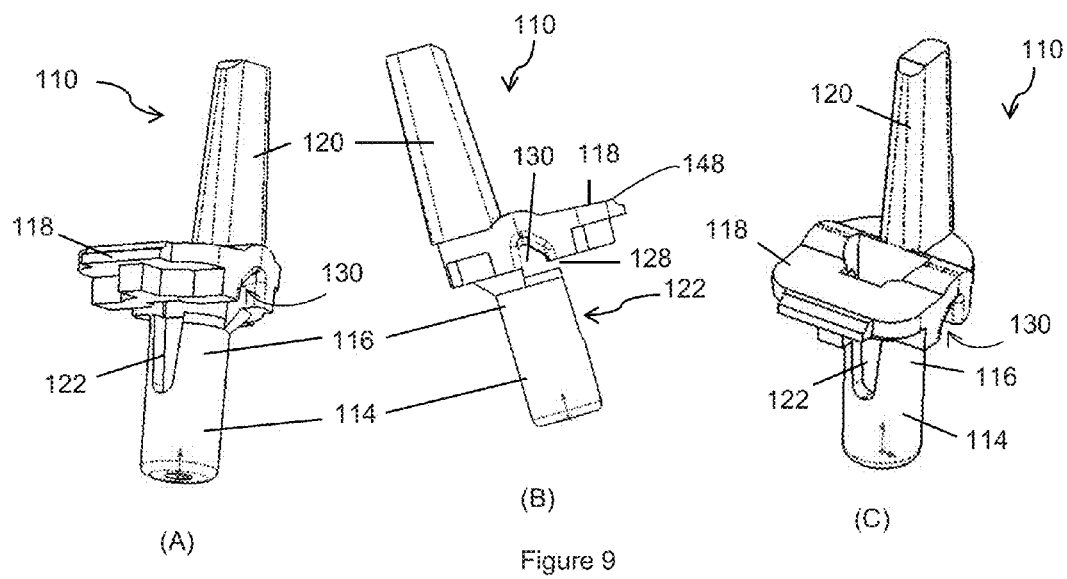
FIGS. 9A-9C are three perspective views of the inventive purge shuttle.

Referring to FIG. 8A, purge shuttle 110 is supported on a wire 124 that is suspended on two posts 126, which are anchored on the body of module 10. Module 10 has a channel 127 that is sized and dimensioned to store wire 124. Wire 124 is inserted under shoulder 118 of purge shuttle 110. As best shown in FIG. 9B, purge shuttle 110 has a slit 128 which opens to channel 130. Slit 128 is sized and dimensioned to allow wire 124 to slip through and be loosely held within channel 130. In one embodiment, wire 124 is made from or comprises a material that reverts to an original shape when heated to a predetermined temperature. A suitable material for wire 24 is a shape memory alloy (SMA). SMA materials are electrically conductive and electrically resistive, such that when an electrical current, e.g., from fuel cell 108, flows through it the current also heats the SMA wire. Suitable SMA materials include, but are not limited to, nickel-titanium or nitinol, which is commercially available as Flexinol™. Other suitable SMA materials include the alloys of Ag—Cd, Au—Cd, Cu—Al—Ni, Cu—Sn, Cu—Zn, Cu—Zn—X (X=Si, Al, Sn), Fe—Pt, Mn—Cu, Fe—Mn—Si, Pt alloys, Co—Ni—Al, Co—Ni—Ga, Ni—Fe—Ga, Ti—Pd in various concentrations, Ni—Ti—Nb and Ni—Mn—Ga. Wire 124 forms a part of purge valve 109.

In this embodiment, when the user activates ON segment 14 of switch 12, the user also opens the purge valve. Switch 12, as best shown in FIG. 8B, in addition to yokes 46 also has purge valve pusher 132, which terminates in two fingers 134. Fingers 134 push down on shoulder 118 of purge shuttle 110 in direction 58, discussed above. This motion moves purge shuttle 110 to the open configuration of FIG. 10A. Extension 120 of purge shuttle 110 disconnects the external load (e.g., an electronic device) from the fuel cell and connects wire 124 to the fuel cell. As the residual gases are purged from anode 107 and replaced by hydrogen fuel, fuel cell 108 produces more electricity, which conducts through wire 124 and heats the wire. As the fuel cell production reaches a desired or steady state level indicating that the purge process is complete, wire 124 is sufficiently heated to return to its memorized shape, i.e., it contracts its length to pull purge shuttle back to its closed configuration as shown in FIG. 10B. Once the purge shuttle is back to the closed configuration, wire 124 is disconnected from the fuel cell circuit, and the external load is reconnected to the fuel cell. Wire 124 is allowed to cool and return to its longer length.

Figure 10C:
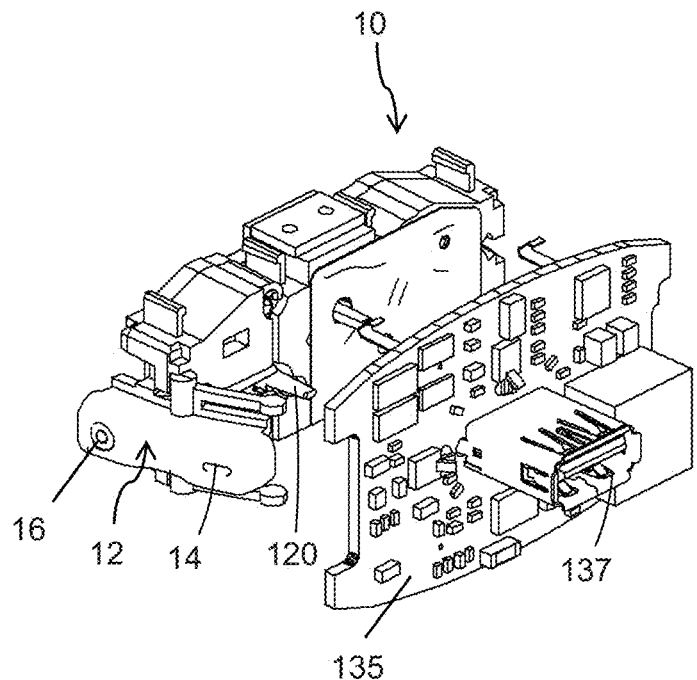
FIG. 10C is an exploded view showing the inventive integrated fluidic interface module with a PC board.

As shown in FIG. 10C, PC board 135 which contains the electrical circuitry, among other things, is disposed adjacent to side 22 of interface module 10. PC board 135 preferably has an electrical output port 137, such as a USB port, to conduct the electricity generated by the fuel cells 108 to an external load or electronic device. External load includes, but is not limited to, DC-DC converter, power conditioning elements, electrical regulator and other electrical components necessary to provide regulated power to the electronic device.

Referring to FIGS. 8C-8E, residual gases to be purged flow in direction 136 enter module 10 through purge port 138. Inside module 10, the residual gases flow through purge channel 140 along direction 142 and exit module 10 via notch 122 of open portion 116 on purge shuttle 110 along direction 144, as shown in FIG. 8D. Residual gases include inert gases, water vapors and condensed water that migrate into the anode plenum through the polymer exchange membrane (PEM) when the fuel cell system is inactive and through the fuel conduits when no fuel cartridge is connected to the system.

Hence, purge valve system 109 of the present invention is manually activated when the fuel cell system is turned on by the user by pushing switch 12 and is automatically de-activated when the fuel cell is sufficiently purged. The fuel cell itself determines when the anode chamber(s) is sufficiently purged, which coincides with the production of electricity when hydrogen gas replaces the residual gases. The de-activation process itself, which occurs automatically, preferably does not consume electricity after the fuel cell is fully conditioned. The power produced by the fuel cell during this transient conditioning period, which is not useful to power a device, is used to heat up wire 124. The power produced during the conditioning period can also be used to heat other components in the fuel cell system 21. No useful electricity needs to be used to de-activate purge valve system 109.

The length and width of wire 124 can be readily ascertained with the steady state output and/or the output during the conditioning of the fuel cell, the thermal conductivity and thermal capacitance of the SMA material, the temperature at which the SMA material reverts to its memorized shape, the amount of retraction by the SMA material, and the force necessary to move purge shuttle from the closed configuration to the open configuration. These factors can be readily look up or measured.

An advantage of this purge valve system is that if the fuel cell is insufficiently purged the valve remains open until the purge process is complete and fuel such as hydrogen gas is reacted in the fuel cell to produce electricity.

The advantages of semi-automatic purge valve 109 over conventional purge valves are readily apparent. Manually operated purge valves may be purged too short which leaves residual gases in the fuel cell, or too long which wastes fuel gas. Elapsed or timed purge valves suffer the same disadvantages as manually purged valves, and they require extra components for the timing mechanism. Electronically actuated purge valves require power from the fuel cells operating in steady state, and extra parts such as solenoid valves and sensors. Electronically actuated valves also cannot be operated at start-up due to the lack of steady state power, or cannot work without an independent power source, such as batteries. Electronically actuated valves also need a microprocessor or controller to function. The deficiencies of conventional purge valves are remedied by the purge valve 109 described above and shown in FIGS. 8A-10B, and inverse purge valve 109' described below.

In another embodiment, this purge valve with SMA wire 124, purge shuttle 110 and sealing member 112 can be deployed as a safety shut-off for a large number of applications to shut off any system when the system temperature, which triggers the SMA wire, reaches a certain predetermined level. Purge shuttle 110 can act like an electrical switch that opens a circuit when the SMA wire retracts. A manual reset, by manually pushing the purge shuttle, is necessary to close the circuit to restart the system.

This safety shut-off feature can be applied to shut down a fuel cell system when it is idle. When there is no load on the fuel cell, e.g., when no electronic device is connected to a fuel cell charger, the electrical current can be diverted to purge valve 109 to heat SMA wire 124 to retract and turn the fuel cell off. In one example, an SMA wire can be connected to module interface port 18. If the fuel cell system overheats, then the SMA wire retracts in direction 50' to withdraw tube 30 from shut-off valve 26 to turn the system off. This action is the equivalent of shutting down the system without pushing OFF segment 16 of switch 12. In another example, a simple circuit is connected between SMA wire 124 of the purge valve 109 or 109' and USB port 137. A temperature sensor, such as a thermistor, connected to a gate is positioned on this circuit. When a threshold temperature is reached the gate opens to isolate the USB port from the fuel cell circuit and connects this circuit to SMA wire 124 to retract the wire to close the system. In another example, the material of SMA wire 124 is selected to retract at or proximate to the system shut-off temperature to shut the system down automatically when the system temperature reaches the shut-off temperature. In another example, a processor or micro-processor preferably located on PCB board 135 directs electrical current to SMA wire 124 after a pre-determined period of inactivity.

Figures 11, 13:
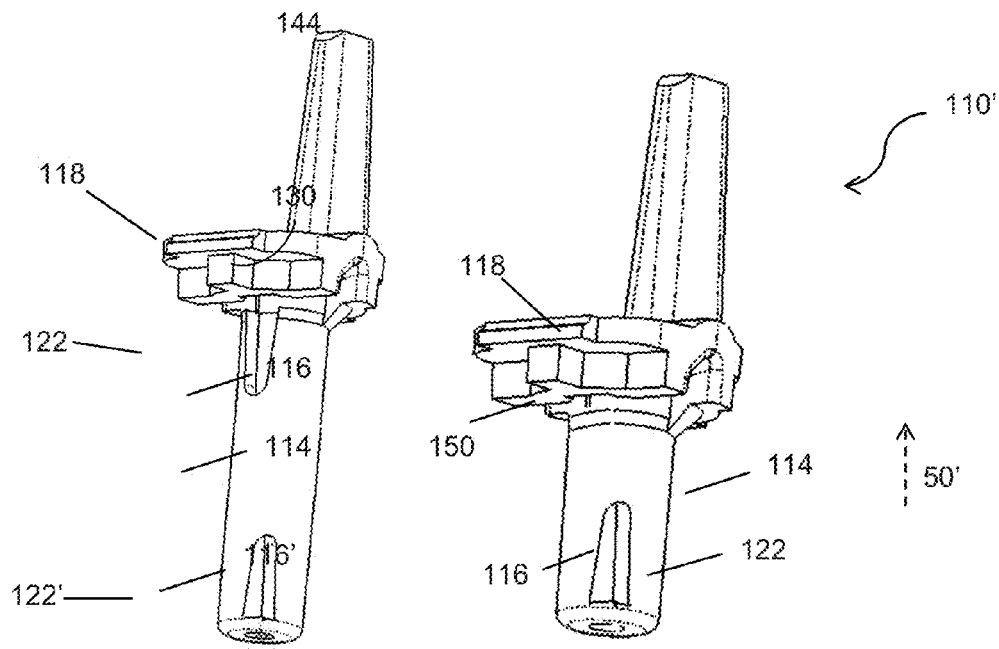
FIG. 11 is a perspective view of an alternative purge shuttle.
FIG. 13 is a perspective view of another alternative purge shuttle.

In another embodiment, the purge shuttle may have two open portions 116 and 116', as best shown in FIG. 11, and designated as double-ended purge shuttle 144. Double-ended purge shuttle 144 can be used as a fluid control in a manifold. For example, one SMA wire 124 can be positioned in channel 130 below shoulder 118 and a second SMA wire 124 can be positioned above shoulder 118. The fuel cell or another electrical system or a controller can selective activate one specific wire 124 to move purge double-ended shuttle 144 to first open section 116 and active the other wire 124 to move double-ended purge shuttle 144 to the other open section 116'. A third SMA wire 124 of different length can be positioned either above or below shoulder 118 to move double-ended purge shuttle 144 to sealing portion 114. By varying the position of double-ended purge shuttle 144, a specific flow channel in a manifold can be selected.

Figure 10D:
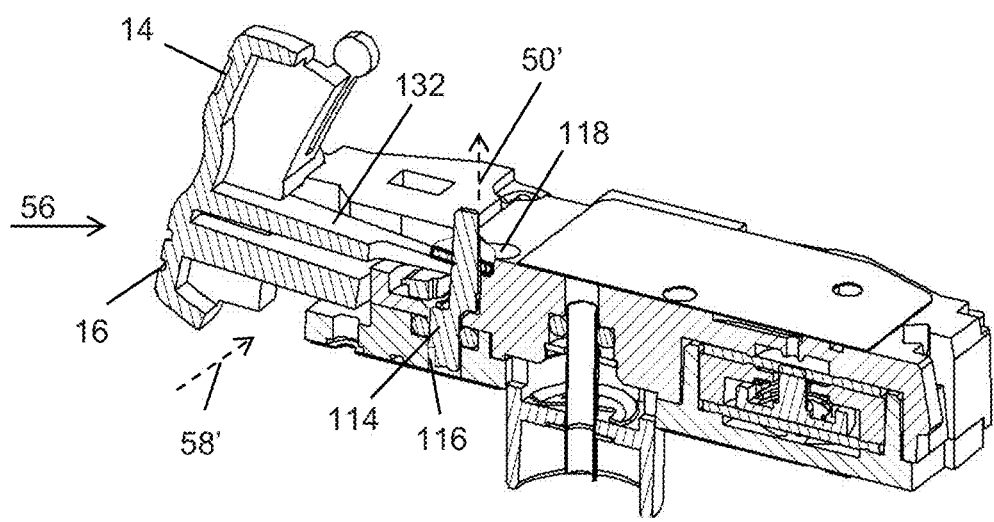
FIG. 10D is a cross-sectional view of the inventive integrated fluidic interface with an inverse purge valve.

In another embodiment, purge valve 109' operates in an inverse manner. Inverse purge valve 109' is aimed or opened when the fuel cell system is turned OFF. In this configuration, when the fuel cell system is OFF inverse purge valve 109' is open, the fuel cell system is ready to be purged when the fuel cell system is turned ON again. Similar to the embodiment discussed above, the fuel cell closes inverse purge valve 109' with the electricity it produces. A minor adjustment to switch 12 is made to accomplish this sequence. Referring to FIG. 8B, purge valve pusher 132, which is shown to be associated with the ON segment 14 of switch 12, can be relocated and be attached to the OFF segment 16 of switch 12, so that actuation of OFF segment 16 would move inverse purge valve to the ON configuration. Alternatively, switch 12 and purge valve pusher 132 may remain substantially the same as shown in FIG. 8B and purge shuttle 110 is modified as shown in FIG. 13 to be an inverse purge shuttle 110' with open portion 116 located at one end and sealing portion 114 away from the end. Additionally, shoulder 118 of the purge shuttle is relocated to be on the opposite side of purge valve pusher 132. As shown in FIG. 10D, as OFF segment 16 is pushed in direction 56 moving purge valve pusher 132 in direction 58', purge valve pusher 132 moves purge shuttle 110' in direction 50' to align open portion 116 with the seal 112 to open and arm inverse purge valve 109' to vent the next time the system is turned ON.

One advantage of inverse purge valve 109' is that the valve would not purge even if a user repeatedly presses ON segment 14 of switch 12, while the fuel cell system is in operation, or holding ON segment 14 down for an extended time, since inverse purge valve 109' is decoupled from ON segment 14. Purging the system while the fuel cell is in full operation would waste fuel, disrupt the operation of the fuel cell, damage SMA wire 12 and cause other adverse effects.

Another advantage of inverse purge valve 109' is that while the fuel cell system is running, a purge operation cannot occur to prevent over-purging. The user would first turn the system OFF by actuating OFF segment 16, which turns the entire system OFF and open the purge valve, and then the user would actuate ON segment 14 to turn the fuel cell system back ON and to purge the system.

Another advantage of the inverse purge valve 109' is that when the fuel cell system is shut down and with inverse purge valve 109' in the open configuration, the anode and the rest of the fuel cell system depressurize and reach equilibrium with the ambient environment. This may reduce the amount of water condensation within the fuel cell system as the fuel cell cools, thereby lessening the purge duration on the next startup.

Figure 12:
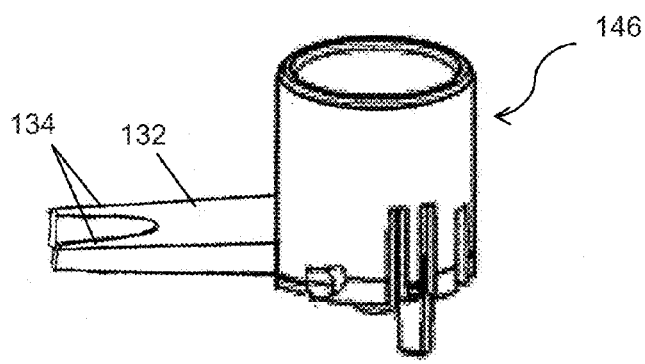
FIG. 12 is a perspective view of an alternative module interface port.

In yet another embodiment, purge valve pusher 132 is connected to module interface port 146 as shown in FIG. 12, which is moved by switch 12 to an extended position in direction 50 to connect to cartridge 20 or to a retracted position in direction 50' to disconnect from cartridge 20 as discussed above. As module interface port 146 is moved in direction 50, which has the same motions as module interface port 18 shown in FIGS. 3B-3C, purge valve pusher 132 would push purge shuttle 110 in direction 50. In this embodiment pusher 132 would be positioned on surface 148 of shoulder 118, as illustrated in FIG. 9B. This would position notch 122 and open portion 116 opposite of sealing member 112 thereby turning the purge valve 109 to the open configuration.

A modification to the purge shuttle allows the purge system in the preceding paragraph to operate in the inverse manner, i.e., turning the system off would open the purge valve. As shown in FIG. 13, purge shuttle 110' is similar to purge shuttle 110 except that the locations of sealing portion 114 and open portion 116 of the shuttle are switched. When module interface port 146 retracts as the system shuts down or turning OFF, purge valve pusher 132, which is attached to module interface port 146 and is in contact with surface 150 of shoulder 118, moves in direction 50' to position open portion 116 and notch 122 opposite of sealing member 112 to open the purge valve.

It is noted that in the embodiments where purge valve pusher 132 is attached to module interface port 146, pusher 132 is positioned at surface 148 or 150 of shoulder 118, so that module interface port 146 can only manually move the purge shuttle 110, 110' in one direction 50 or 50'. SMA wire 124 is located on the opposite surface to automatically close the purge valve.

The purge system using module interface port 146 and purge shuttle 110' in the inverse manner confers a number of advantages, including the situation where every time a new cartridge 20 is inserted into the fuel cell system, inverse purge valve 109' is moved to or remains in the open configuration and the fuel cell system is ready to be purged. When an old or empty cartridge 20 is removed and switch 12 is turned OFF, then module interface port 146 is retracted and purge valve 109' with purge shuttle 110' is in the open configuration and the fuel cell system is ready to be purged when a fresh cartridge is inserted and switch 12 is turned ON.

However when the old or empty cartridge 20 is removed and switch 12 remains in the ON position, module interface port 146 remains extended and purge valve 109' remains in the closed configuration. Advantageously, when a fresh cartridge is inserted the cartridge due to friction and contacts with module interface port 146, the insertion motion pushes module interface port 146 to the retracted position and purge valve 109' is in the open configuration and the fuel cell system is ready to be purged at the next start up.

Hence, the purge system using module interface port 146 and purge shuttle 110' operating in the inverse manner assures that when a fresh cartridge is used for the first time the fuel cell system is ready to be purged at the next start up, as well as after turning the fuel cell system OFF and then ON again.

Figure 14:
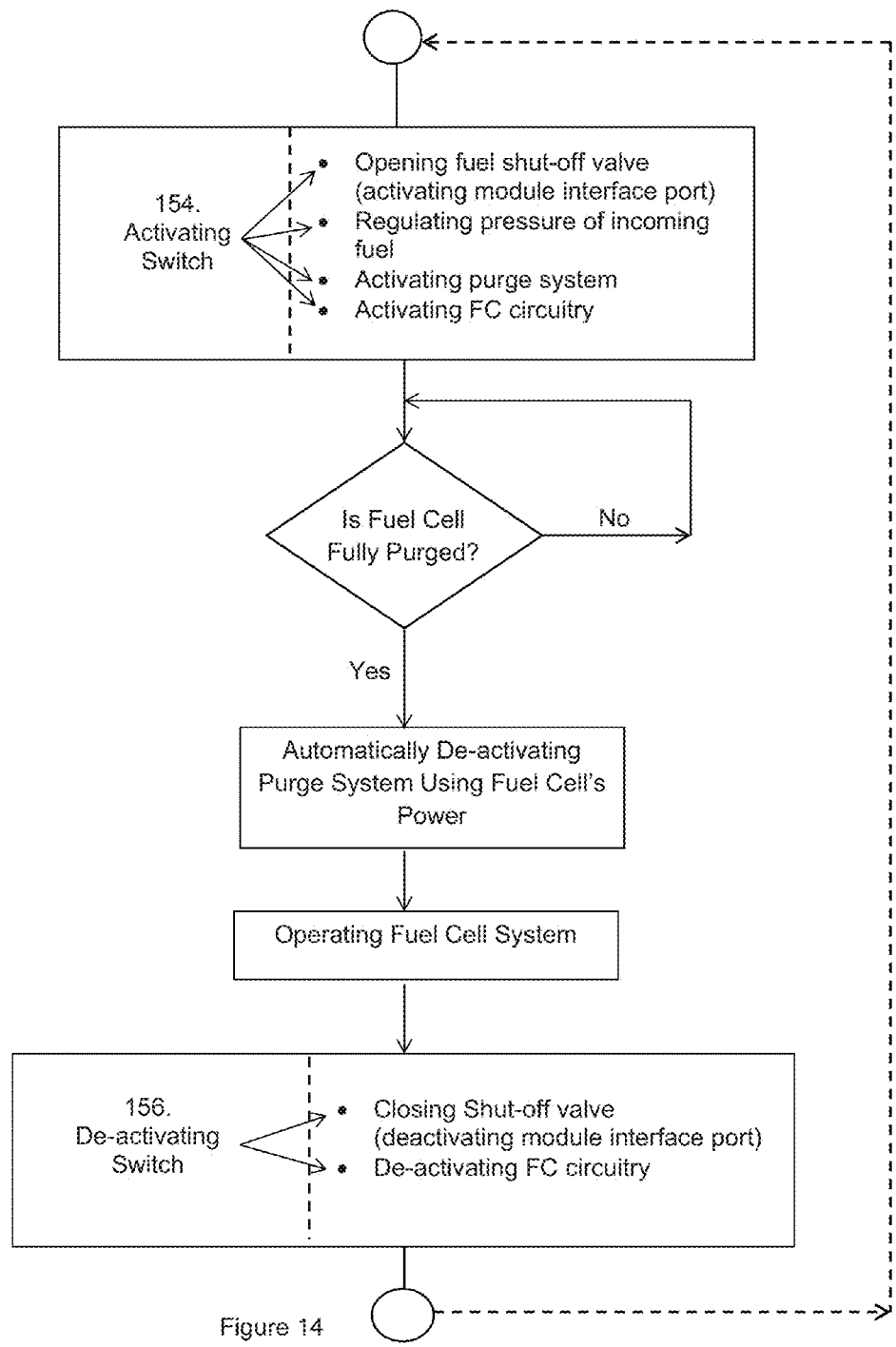
FIGS. 14 and 15 are flow charts illustrating inventive methods of operating fuel cell systems.

The present invention further includes methods for operating the fuel cell system using the purge valves 109 and 109' described above or other purge valves. First, method 152 is shown in FIG. 14. Demonstrating the integrated aspect of the present invention, a user activates the system once at step 154, e.g., activating switch 12. The system performs at least four functions or steps as the result of this activation including (i) activating module interface port 18 which opens the fuel shut-off valve 26, (ii) regulating the pressure of the incoming fuel using fuel regulator 60, (iii) activating purge valve system 109 and electrically connecting the fuel cell to the purge valve system to vent the anode plenum of the fuel cells and (iv) connecting the fuel cell to the external load after the purge valve system is deactivated. Nothing else is required from the user until system is shut-down. Thereafter, the system uses its own power from the fuel cell and automatically closes the purge valve when purging is completed, e.g., using a SMA material, without active control by a microprocessor, sensors or a user. The system then operates normally to produce electricity to run a load. When the user wishes to shut the system down, s/he de-actives switch 12, which closes shut-off valve 26 by retracting module interface port 18 and de-activates the fuel cell circuitry.

Figure 15:
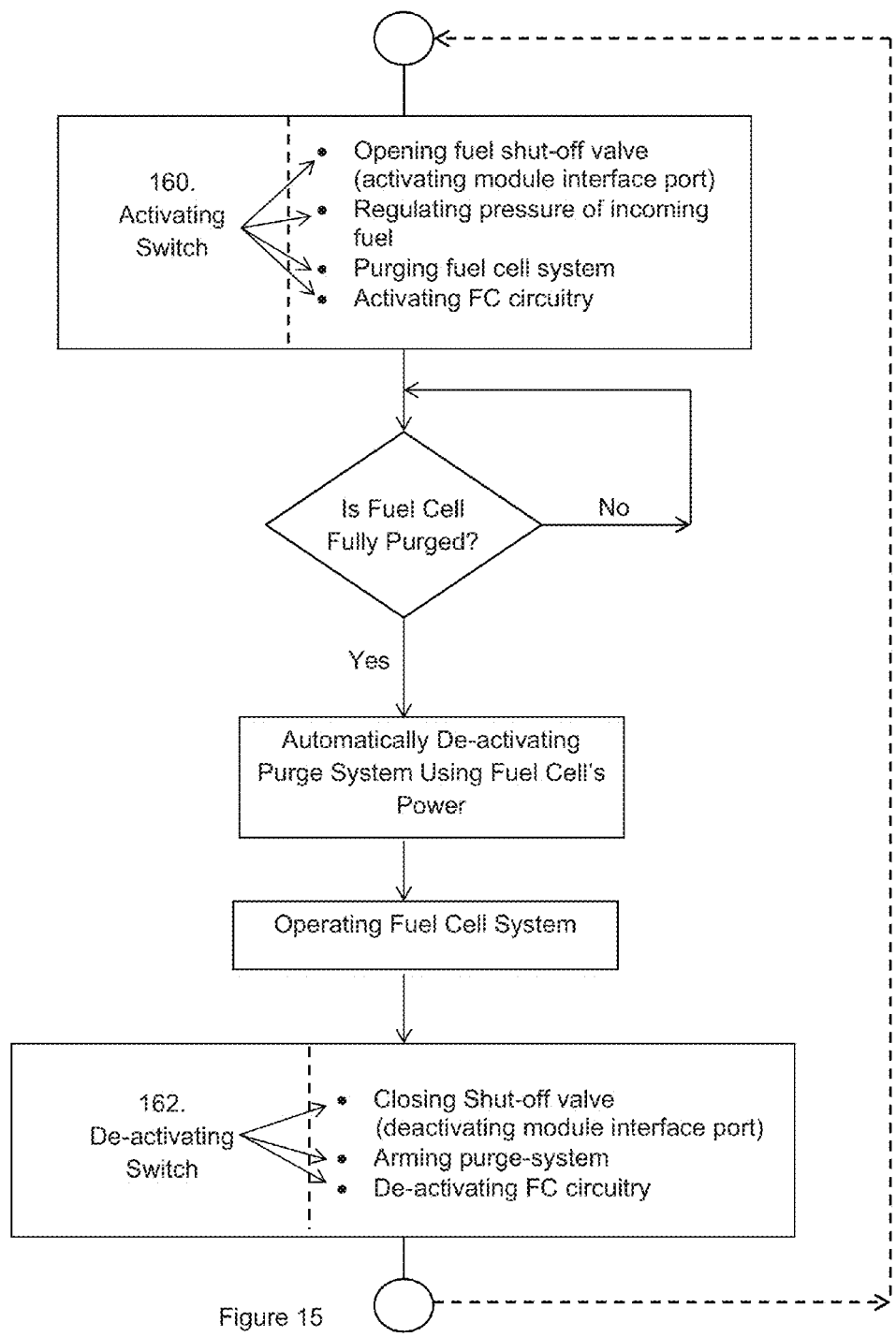

FIG. 15 illustrates another method for operating a fuel cell. Inverse method 158 is similar to method 152, except that in the activating step 160 the system purges the fuel cell system or vents the anode plenum of the fuel cell and in the deactivating step 162 the purged system is armed, i.e., inverse purge valve is opened when the system shuts down, as discussed above.

Demonstrating the passive aspect of the present invention, integrated fluidic interface module 10, method 152 and inverse method 158 do not require controller or micro-processor to operate, and no user interaction is necessary other than activating the ON/OFF switch. No external power source, such as batteries, is required to start the system. Alternatively, methods 152 and 158 can be operated with active control by a processor controlling an electrical valve, e.g., solenoid valve.

Figure 16:
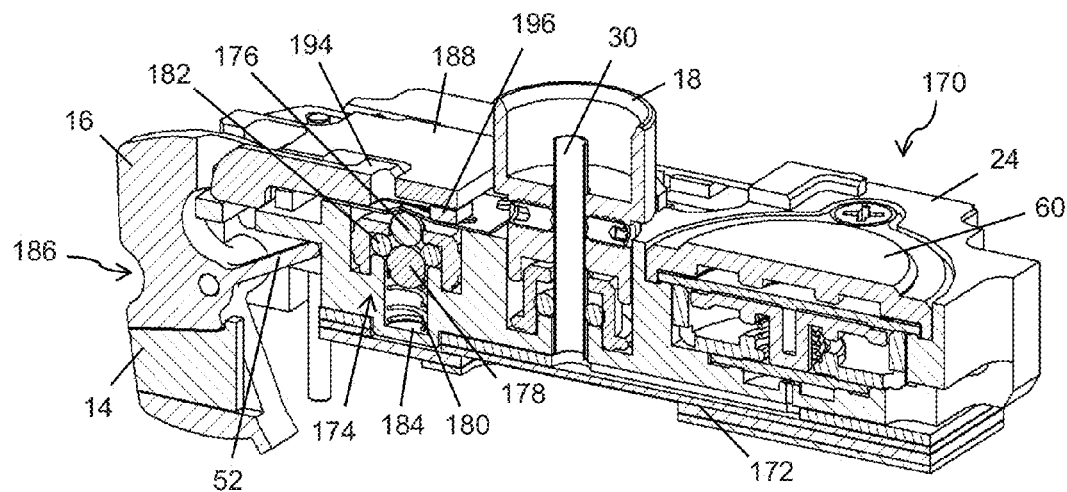
FIG. 16 is a cross-sectional view of another integrated fluidic interface module.
Figure 17A:
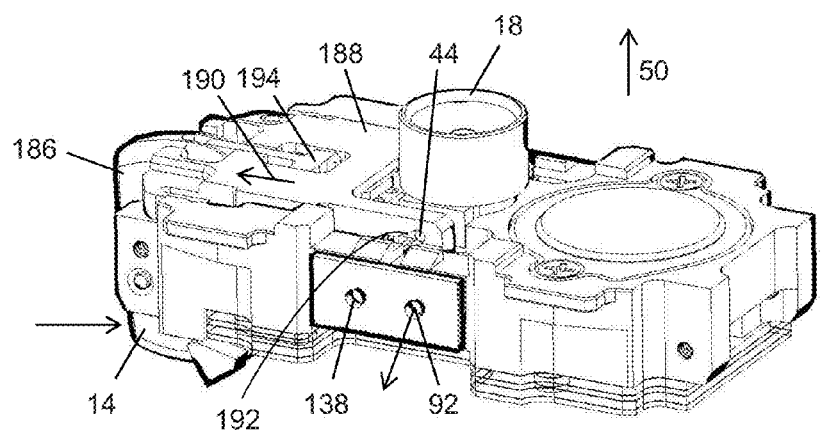
FIGS. 17A and 17B are perspective view of the integrated fluidic interface module showing the actuation of same.
Figure 17B:
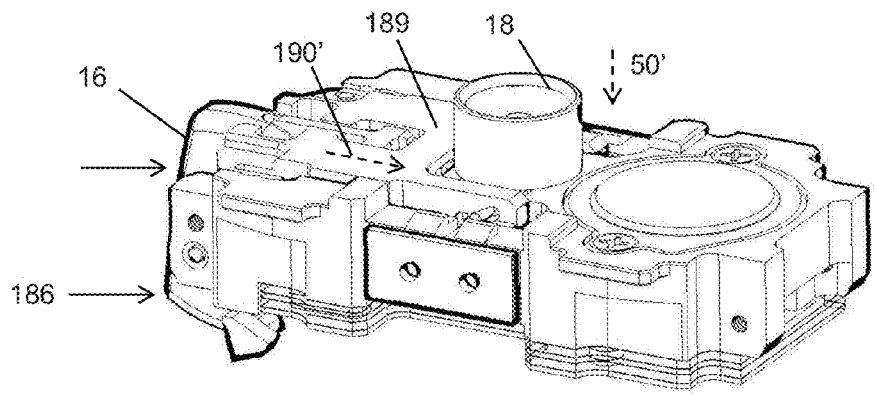

Another integrated fluidic interface module is illustrated in FIGS. 16-17B. Similar to module 10, module 170 has movable module interface port 18 and tube 30 to open valve 26 on cartridge 20. Module 170 also has pressure regulator 60 and a flow manifold 172 fluidly connecting tube 30 to pressure regulator 60 and out of module outlet 92 to fuel cells 108.

Module 170 has a manual purge valve 174, which comprises a ball valve and ball actuator 176. The ball valve comprises sealing ball 178 biased by spring 180 into sealing element 182. Actuator ball 176 sits immediately adjacent to sealing ball 178, and actuator ball 176 is pushed towards sealing ball 178 against the force of spring 180 to open purge valve 174. Residual gases from the fuel cells enter module 170 at purge port 138 and out of module 170 to vent at exit hole 184.

Switch 186 on module 170 is similar to switch 12, and is also used to extend and to retract module interface port 18. Switch 186 is pivotally attached to the body of module 170. When a user pushes ON segment 14 of switch 186, this action moves actuator plate 188 in direction 190 and compresses spring arm 52. This movement forces side knobs 44 on module interface port 18 to ride up ramp or cam surface 192, thereby extending or moving module interface port 18 in direction 50, as shown in FIG. 17A. In this configuration, module interface port 18 advances towards cartridge 20 to open shut-off valve 26. When released, switch 186 returns to its rest position due to spring arm 52 releasing its stored energy, actuator plate 188 remains in the configuration shown in FIG. 17A to keep module interface port 18 engages with cartridge 20.

When the user pushes OFF segment 16 of switch 186, this action moves actuator plate 188 in direction 190'. This movement forces sides knobs 44 on module interface port 18 to ride down ramp or cam surface 192, thereby retracting or moving module interface port 18 in direction 50', as shown in FIG. 17B. In this configuration, module interface port 18 withdraws from cartridge 20 allowing cartridge shut-off valve 26 to close.

Similar to module 10, switch 186 of module 170 also actuates manual purge valve 174. Referring to FIG. 16, switch 186 is connected to purge actuator 194. When the user pushes ON segment of switch 186, purge actuator 194 also moves in direction 190 such that edge 196 of purge actuator 194 moves over actuator ball 176 to open purge valve 174. Due to the spacing between edge 196 and the rest of purge actuator 194, when switch 186 returns to the rest position edge 196 moves away from actuator ball 176 and purge valve 174 closes. The duration of the period that purge valve 174 opens depends on the duration that switch 186 is held in the ON position. Unlike actuator plate 188, purge actuator 194 is fixedly connected to switch 186 so that these two components move together.

As described above, switch 186 actuates both the module interface port 18 to open shut-off valve 26 and purge valve 174, as well as activating the fuel cell circuitry.

Any known fuel cell that consumes hydrogen can be used in fuel cell system 10. Preferably planar or side-by-side fuel cells are used. Suitable fuel cells are disclosed in U.S. Pat. Nos. 5,989,741, 6,127,058, 7,632,587, 7,378,176 and 7,474,075, published U.S. patent application nos. 2002/0182475, 2004/0224190, 2006/0127734, 2007/0184330, 2007/0196701, 2008/0233454, 2009/0081493, 2009/0311561, 2009/0162722, 2009/0130527, 2011/0003299 and US 2011/0165495 and published international patent application nos. WO 2009/105896, WO 2011/079378, WO 2011/079377, among others. These references are incorporated herein by reference in their entireties.

Any known hydrogen storing or generating cartridges or system can be used. Such systems are disclosed in U.S. Pat. Nos. 7,674,540, 8,002,853, 7,481,858, 7,727,293 and 7,896,934, and published U.S. patent application nos. 2010/0104481, 2011/0189574, 2011/0243836 and 2009/0123342, among others. These references are incorporated herein by reference in their entireties. Fuel cartridges that contain liquid fuel cell fuels, such as butane or methanol, disclosed in U.S. Pat. Nos. 7,172,825 and 7,059,582 can also be used with the various embodiments of the present invention.

Suitable pressure regulators are disclosed in U.S. Pat. No. 8,002,853, published international patent application no. WO 2011/127608 and published U.S. patent application nos. 2008/0233446, 2010/0104481 and 2011/0212374. These references are incorporated herein by reference in their entireties.

The fuel cell system 21 may also have a relief valve or a vent valve to release hydrogen fuel or other fuel when the internal pressure exceeds a certain level.

The preceding detailed description refers to the accompanying drawings that depict various details of examples embodiments. The discussion addresses various examples of the inventive subject matter at least partially in reference to these drawings, and describes the depicted embodiments in sufficient detail to enable those skilled in the art to practice the embodiments. Many other embodiments may be utilized other than the illustrative examples discussed herein, and many structural and operational changes in addition to the alternatives specifically discussed herein may be made without departing from the scope of the inventive subject matter.

Throughout the preceding description, specific details are set forth in order to provide a more thorough understanding of the invention. However, the invention may be practiced without these particulars. In other instances, well known elements have not been shown or described in detail in order to avoid unnecessarily obscuring the invention. The drawings show, by way of illustration, specific embodiments in which the invention may be practiced. These embodiments may be combined, other elements may be utilized or structural or logical changes may be made without departing from the scope of the invention. Accordingly, the specification and drawings are to be regarded in an illustrative, rather than a restrictive, sense.

All publications, patents and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

The following parts list correlates the reference numbers used in the drawings to the part names used in the specification.

| Reference # | Parts Names |
|---|---|
| 10 | Integrated fluidic interface module |
| 12 | Switch |
| 14 | ON segment |
| 16 | OFF segment |
| 18 | Module interface port |
| 20 | Fuel cartridge |
| 21 | Fuel cell system |
| 22 | Top side |
| 23 | Clamp on fuel cell system 21 |
| 24 | Bottom side |
| 26 | Cartridge shut-off valve |
| 28 | Outer guard of cartridge port 18 |
| 30 | Inner tube of cartridge port 18 |
| 32 | Central post of valve 26 |
| 34 | Gap on valve 26 to receive tube 30 |
| 36 | Valve body of valve 26 |
| 38 | Seal retainer on valve 26 |
| 40 | Seal(s) in valve 26 |
| 42 | Channel on cartridge 20 matching guard 28 |
| 44 | Knob on module interface port 18 |
| 45 | Detent on port 18 |
| 46 | Yoke(s) on switch 12 |
| 47 | Leg of detent 45 |
| 48 | U-shaped end of yoke 46 |
| 50, 50' | Directions of movement of port 18 |
| 52 | Spring arm on switch 12 |
| 54 | Pivot boss on switch 12 |
| 56, 56' | Directions of movement of switch 12 |
| 58, 58' | Directions of movement of yoke 12 |
| 60 | Pressure regulator |
| 62 | Inlet diaphragm |
| 64 | Shuttle |
| 66 | Outlet diaphragm |
| 68 | Large end of shuttle 64 |
| 70 | Small end of shuttle 64 |
| 72 | Shuttle housing |
| 73 | Shuttle housing vent |
| 74 | Spring inside pressure regulator 60 |
| 76 | Outlet chamber |
| 78 | Inlet chamber |
| 80 | Inlet channel |
| 82 | Direction of inlet fuel flow |
| 84 | Inlet of pressure regulator 60 |
| 86 | Outlet of pressure regulator 60 |
| 88 | Outlet channel |
| 90 | Direction of outlet fuel flow |
| 92 | Module outlet |
| 94 | Feedback port |
| 96 | First feedback channel |
| 98 | Direction of feedback flow |
| 100 | Second feedback channel |
| 102 | Direction of feedback flow |
| 104 | Outlet chamber port |
| 106 | Thin covering films |
| 107 | Anode(s) |
| 108 | Fuel cell(s) |
| 109 | Semi-automatic purge valve |
| 109' | Semi-automatic inverse purge valve |
| 110 | Purge shuttle |
| 110' | Inverse purge shuttle |
| 112 | Sealing member for purge valve |
| 113 | Direction of sealing for purge valve |
| 114 | Sealing portion of purge shuttle 110 |
| 115 | Direction of movement for purge shuttle |
| 116 | Open portion of purge shuttle 110 |
| 118 | Shoulder of purge shuttle 110 |
| 120 | Extension on purge shuttle 110 |
| 122 | Notch on purge shuttle 110 |
| 124 | Shape memory alloy (SMA) wire |
| 126 | Posts supporting wire 124 |
| 127 | Channel on module 10 to store wire 124 |
| 128 | Slit under shoulder 118 |
| 130 | Channel on purge shuttle 110 for wire 124 |
| 132 | Purge valve pusher |

-continued

| Reference # | Parts Names |
|---|---|
| 134 | Fingers on pusher 132 |
| 135 | PC board |
| 136 | Direction of purging gases |
| 137 | Output/USB port |
| 138 | Purge port on module 10 |
| 140 | Purge channel(s) |
| 142 | Direction of purged gases |
| 144 | Double-ended purge shuttle |
| 146 | Module interface port with pusher 132 |
| 148, 150 | Opposite surfaces on shoulder 118 |
| 152-156 | Methods of operating the fuel cell system |
| 170 | Integrated fluidic interface module |
| 172 | Manifold in module 170 |
| 174 | Manual purge valve |
| 176 | Actuating ball |
| 178 | Sealing ball |
| 180 | Spring |
| 182 | Sealing member |
| 184 | Purge exit hole |
| 186 | Switch |
| 188 | Actuating plate |
| 190, 190' | Directions of movement of actuating plate 188 |
| 192 | Ramp or cam surface |
| 194 | Purge actuator |
| 196 | Edge of purge actuator 194 |

It is intended that the present specification and examples be considered as exemplary only with a true scope and spirit of the invention being indicated by the following claims and equivalents thereof. Other embodiments of the present invention will be apparent to those skilled in the art from consideration of the present specification and practice of the present invention disclosed herein. Additionally, components or features of one embodiment can be utilized in other embodiments.

I claim:

1. A method of operating a fuel cell system comprising at least one fuel cell, said method comprising the steps of
    (a) flowing fuel to the fuel cell system;
    (b) connecting the at least one fuel cell to a conductive element in a purge valve;
    (c) venting an anode of the at least one fuel cell through the purge valve;
    (d) disconnecting the at least one fuel cell from the purge valve; and
    (e) connecting the at least one fuel cell to an external load.

2. The method of claim 1, wherein the conductive element comprises a shape memory alloy.

3. The method of claim 1, wherein in step (d) the fuel cell heats up the conductive element which retracts and moves the purge valve to a closed position.

4. The method of claim 1 further comprises the step of moving the purge valve to an open position at the fuel cell system's start-up.

5. The method of claim 1 further comprises the step of moving the purge valve to an open position at the fuel cell system's shut-down.

6. The method of claim 1, wherein the disconnecting step (d) occurs without being controlled.

7. The method of claim 1, wherein the disconnecting step (d) is electrically actuated.

8. The method of claim 1, wherein the connecting step (b) is manually actuated.

* * * * *